United States Patent
Nilsson et al.

(10) Patent No.: US 9,716,324 B2
(45) Date of Patent: *Jul. 25, 2017

(54) NODE FOR HIGH-RISE BUILDING COVERAGE

(71) Applicant: Telefonaktiebolaget LM Ericsson (publ), Stockholm (SE)

(72) Inventors: Andreas Nilsson, Göteborg (SE); Fredrik Athley, Kullavik (SE); Martin Johansson, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/134,986

(22) Filed: Apr. 21, 2016

(65) Prior Publication Data

US 2016/0240932 A1 Aug. 18, 2016

Related U.S. Application Data

(63) Continuation of application No. 13/882,366, filed as application No. PCT/EP2013/058653 on Apr. 25, 2013, now Pat. No. 9,325,078.

(51) Int. Cl.
*H01Q 21/24* (2006.01)
*H01Q 25/00* (2006.01)
(Continued)

(52) U.S. Cl.
CPC ............ *H01Q 21/24* (2013.01); *H01Q 1/241* (2013.01); *H01Q 21/0006* (2013.01);
(Continued)

(58) Field of Classification Search
CPC ...... H01Q 21/006; H01Q 21/24; H01Q 21/26; H01Q 1/246; H04B 7/2606
(Continued)

(56) References Cited

U.S. PATENT DOCUMENTS 9,325,078 B2 * 4/2016 Nilsson ............ H01Q 21/0006
2004/0108956 A1 6/2004 Gottl et al.
(Continued)

FOREIGN PATENT DOCUMENTS

WO 2011050866 A1 5/2011
WO 2011095184 A1 8/2011
WO 2011134519 A1 11/2011

OTHER PUBLICATIONS

International Search Report issued in corresponding PCT Application No. PCT/EP2013/058653, on Jan. 22, 2014, 5 pages.
(Continued)

*Primary Examiner* — Jessica Han
*Assistant Examiner* — Daniel J Munoz
(74) *Attorney, Agent, or Firm* — Rothwell, Figg, Ernst & Manbeck, P.C.

(57) ABSTRACT

An antenna arrangement with two horizontal and two vertical array antennas. A first horizontal antenna port and a second vertical antenna port are connected to a first polarization. A first vertical antenna port and a second horizontal antenna port are connected to an orthogonal second polarization. Each port is connected to corresponding antenna elements. The first horizontal antenna port and the first vertical antenna port are connected in phase. The second horizontal antenna port and the second vertical antenna port are connected with opposite phases. A plurality of antenna element symmetry pairs are formed with respect to a common symmetry point. Certain weights are applied to the antenna elements of each symmetry pair, where a weight for a certain polarization in an antenna element in a symmetry pair comprises the complex conjugated weight for an orthogonal polarization in the other antenna element in the symmetry pair.

10 Claims, 5 Drawing Sheets

(51) Int. Cl.
*H01Q 21/26* (2006.01)
*H01Q 21/00* (2006.01)
*H04B 7/26* (2006.01)
*H01Q 1/24* (2006.01)

(52) U.S. Cl.
CPC ............ *H01Q 21/26* (2013.01); *H01Q 25/00* (2013.01); *H04B 7/2606* (2013.01); *H01Q 1/246* (2013.01)

(58) Field of Classification Search
USPC ................................. 343/853, 893; 342/373
See application file for complete search history.

(56) References Cited

U.S. PATENT DOCUMENTS

| | | | | |
|---|---|---|---|---|
| 2007/0205955 | A1* | 9/2007 | Korisch | H01Q 1/246 343/853 |
| 2010/0066634 | A1* | 3/2010 | Derneryd | H01Q 3/26 343/893 |
| 2010/0227646 | A1* | 9/2010 | Ogawa | H01Q 1/246 455/562.1 |
| 2012/0062440 | A1 | 3/2012 | Tasaki et al. | |
| 2012/0212372 | A1* | 8/2012 | Petersson | H01Q 3/26 342/373 |

OTHER PUBLICATIONS

Japanese Office Action issued in related Application No. 2016-509304, dated Oct. 19, 2016, 5 pages.

* cited by examiner

NODE FOR HIGH-RISE BUILDING COVERAGE

CROSS-REFERENCE TO RELATED APPLICATIONS

This application is a continuation of U.S. application Ser. No. 13/882,366 (published as US 2015-0009091), which is a national stage of international application no. PCT/EP2013/058653, filed on filed Apr. 25, 2013. The above identified applications and publication are incorporated by reference.

TECHNICAL FIELD

The present invention relates to a node in a wireless communication system, the node comprising at least one antenna arrangement. Each antenna arrangement comprises a first horizontal array antenna with at least one first horizontal antenna port, a second horizontal array antenna with at least one second horizontal antenna port, a first vertical array antenna with at least one first vertical antenna port and a second vertical array antenna with at least one second vertical antenna port. Each horizontal array antenna port is connected to a corresponding set of horizontal antenna elements arranged along a horizontal extension, and each vertical array antenna port is connected to a set of vertical antenna elements arranged along a vertical extension. The vertical extension is perpendicular to the horizontal extension.

Each set of horizontal antenna elements is arranged to radiate a main beam having a half-power beamwidth in an elevation direction, around the horizontal extension, which exceeds its half-power beamwidth in an azimuth direction, around the vertical extension, with at least a factor two. Each set of vertical antenna elements are arranged to radiate a main beam having a half-power beamwidth in the azimuth direction which exceeds its half-power beamwidth in the elevation direction with at least a factor two.

The first horizontal array antenna and the first vertical array antenna constitute a first antenna pair, and the second horizontal array antenna and the second vertical array antenna constituting a second antenna pair.

BACKGROUND

A large part of the traffic load in future communication systems is expected to be from indoor users, for example in office buildings, apartment buildings, etc. In communication cells with such buildings, it is difficult for base station antennas to provide good coverage simultaneously to both street-level users that are distributed in the horizontal plane, and in-building users which are distributed in the vertical direction, especially due to the penetration loss that is experienced by signals propagating through building walls.

One way to solve this problem is to add an additional sector antenna to a conventional three-sector macro-site for each sector where vertical coverage is required. The additional sector antenna is added to an original sector antenna for each sector where vertical coverage is required, and the additional sector antenna is mounted sideways, i.e., horizontally, in order to cover the vertical angular range corresponding to the high building. In this way a new sector is created, dedicated to serve users inside the high building.

Since there will be a large overlap between the radiation patterns of such an additional sector antenna and the patterns of the original sector antenna, there will be interference and handover problems. Furthermore, in addition to an additional sector antenna, the new sector also requires additional hardware such as radio, baseband processing, etc.

There is thus a desire to obtain a node with at least one antenna arrangement with coverage both in azimuth and elevation which does not have the disadvantages of such prior art arrangements.

SUMMARY

The object of the present invention is to provide a node with at least one antenna arrangement with coverage both in azimuth and elevation which does not have the disadvantages of prior art arrangements.

This object is obtained by means of a node in a wireless communication system, the node comprising at least one antenna arrangement. Each antenna arrangement comprises a first horizontal array antenna with at least one first horizontal antenna port, a second horizontal array antenna with at least one second horizontal antenna port, a first vertical array antenna with at least one first vertical antenna port and a second vertical array antenna with at least one second vertical antenna port. Each horizontal array antenna port is connected to a corresponding set of horizontal antenna elements arranged along a horizontal extension, and each vertical array antenna port is connected to a set of vertical antenna elements arranged along a vertical extension. The vertical extension is perpendicular to the horizontal extension.

Each set of horizontal antenna elements is arranged to radiate a main beam having a half-power beamwidth in an elevation direction, around the horizontal extension, which exceeds its half-power beamwidth in an azimuth direction, around the vertical extension, with at least a factor two. Each set of vertical antenna elements are arranged to radiate a main beam having a half-power beamwidth in the azimuth direction which exceeds its half-power beamwidth in the elevation direction with at least a factor two.

The first horizontal array antenna and the first vertical array antenna constitute a first antenna pair, and the second horizontal array antenna and the second vertical array antenna constituting a second antenna pair.

Furthermore, a first horizontal antenna port is connected to a first polarization in the corresponding antenna elements, and a first vertical antenna port is connected to a second polarization in the corresponding antenna elements. A second horizontal antenna port is connected to the second polarization in the corresponding antenna elements, and a second vertical antenna port is connected to the first polarization in the corresponding antenna elements. The first polarization and the second polarization are mutually orthogonal, Said first horizontal antenna port and said first vertical antenna port are connected in phase, and said second horizontal antenna port and said second vertical antenna port are connected with opposite phases.

With respect to a common symmetry point, each antenna element in the first antenna pair is symmetrically arranged to a corresponding antenna element in the second antenna pair, such that a plurality of antenna element symmetry pairs are formed. Certain weights, wn, are applied to the antenna elements of each symmetry pair, and a weight, wn, for a certain polarization in an antenna element in a symmetry pair comprises the complex conjugated weight, wn*, for an orthogonal polarization in the other antenna element in the symmetry pair.

According to an example, the antenna arrangement comprises antenna elements which are dual polarized with both the first polarization and the second polarization. An additional first horizontal antenna port is connected to the second polarization in the corresponding antenna elements, and an additional first vertical antenna port is connected to the first polarization in the corresponding antenna elements. An additional second horizontal antenna port is connected to the first polarization in the corresponding antenna elements, and an additional second vertical antenna port is connected to the second polarization in the corresponding antenna elements.

Said additional first horizontal antenna port and said additional first vertical antenna port are connected in phase, and said additional second horizontal antenna port and said additional second vertical antenna port are connected with opposite phases.

According to another example, the antenna elements in each symmetry pair have equal radiation patterns.

According to another example, the connected first antenna ports are connected in at least one respective combiner/divider, and the connected second antenna ports are connected in at least one further respective combiner/divider.

According to another example, either the phase difference is accomplished in said further respective combiner/divider, or by means of adding an additional negative sign to certain weights. In the latter case, the weights that are applied to the antenna elements of the second horizontal array antenna, or the weights that are applied to the antenna elements of the second vertical array antenna each one further comprises an additional negative sign, said additional negative sign accomplishing said phase difference.

Other examples are disclosed in the dependent claims.

A number of advantages are obtained by means of the present invention, mainly better radiation patterns and polarization properties for base station antennas arrangements in high-rise building scenarios are provided compared to prior art solutions.

BRIEF DESCRIPTION OF THE DRAWINGS

The present invention will now be described more in detail with reference to the appended drawings, where.

DETAILED DESCRIPTION

Figure 1:
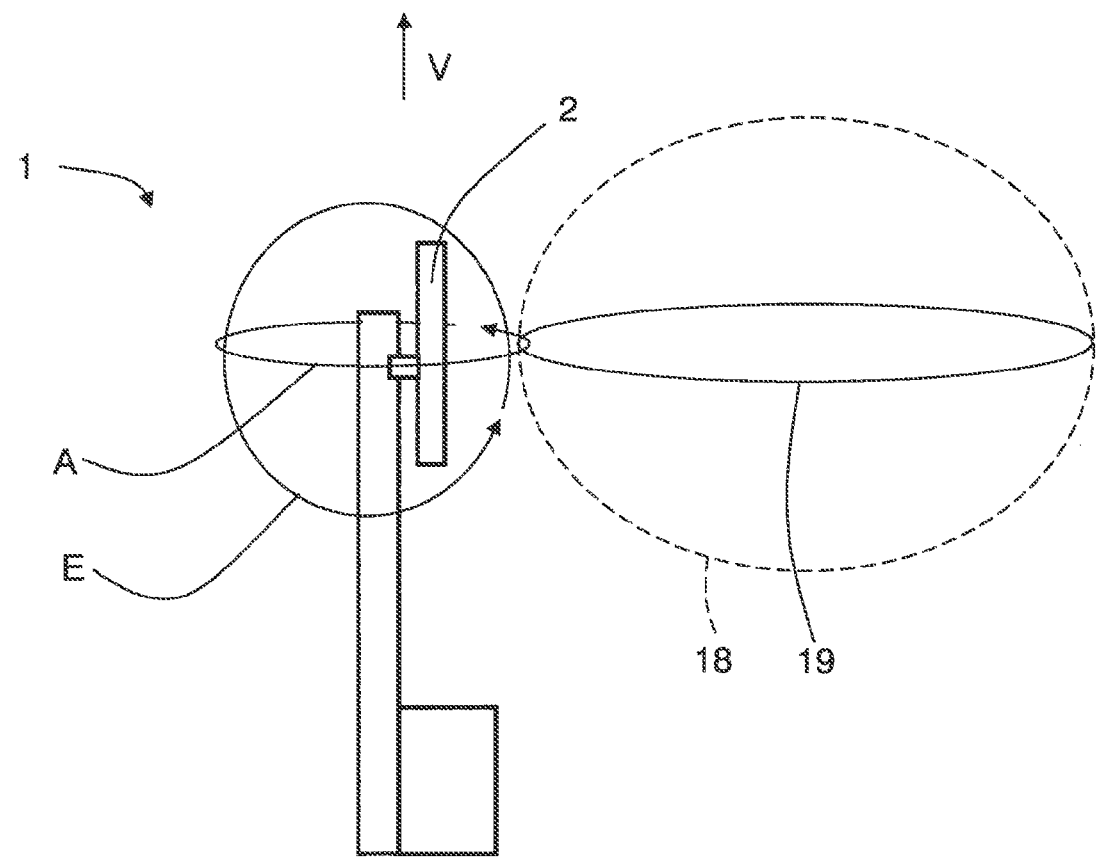
FIG. 1 schematically shows a node in a wireless communication system.
Figure 2:
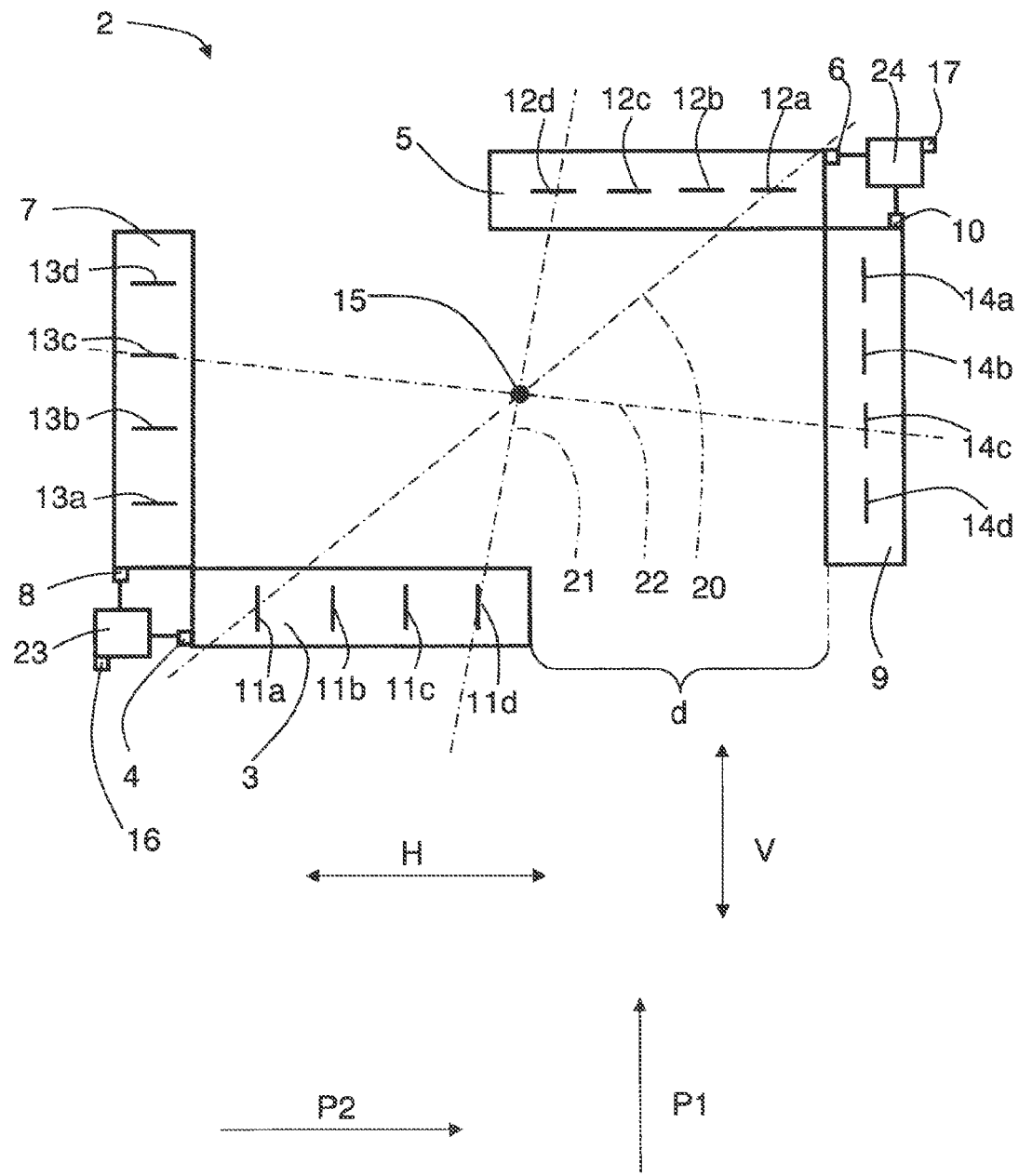
FIG. 2 schematically shows a first example of an antenna arrangement according to the present invention.

With reference to FIG. 1, there is a node 1 in a wireless communication system, the node 1 comprising an antenna arrangement 2. With reference also to FIG. 2, showing a first example of an antenna arrangement, the antenna arrangement 2 comprises a first horizontal array antenna 3 with a first horizontal antenna port 4, a second horizontal array antenna 5 with a second horizontal antenna port 6, a first vertical array antenna 7 with a first vertical antenna port 8 and a second vertical array antenna 9 with a second vertical antenna port 10.

Each horizontal array antenna port 4, 6 is connected to a corresponding set of horizontal antenna elements 11a, 11b, 11c, 11d; 12a, 12b, 12c, 12d arranged along a horizontal extension H, and each vertical array antenna port 8, 10 is connected to a set of vertical antenna elements 13a, 13b, 13c, 13d; 14a, 14b, 14c, 14d arranged along a vertical extension V, where the vertical extension V is perpendicular to the horizontal extension H. In this example, each set of antenna elements 11a, 11b, 11c, 11d; 12a, 12b, 12c, 12d; 13a, 13b, 13c, 13d; 14a, 14b, 14c, 14d is constituted by four uniformly and linearly positioned antenna elements, each array antenna port 4, 6, 8, 10 being connected to a corresponding first antenna element 11a, 12a, 13a, 14a, second antenna element 11b, 12b, 13b, 14b, third antenna element 11c, 12c, 13c, 14c and fourth antenna element 11d, 12d, 13d, 14d.

Each set of horizontal antenna elements 11a, 11b, 11c, 11d; 12a, 12b, 12c, 12d is arranged to radiate a main beam 18 with a half-power beamwidth in an elevation direction E, around the horizontal extension H, which exceeds its half-power beamwidth in an azimuth direction A, around the vertical extension V, with at least a factor two. In the same way, each set of vertical antenna elements is arranged to radiate a main beam 19 having a half-power beamwidth in the azimuth direction A which exceeds its half-power beamwidth in the elevation direction E with at least a factor two.

The first horizontal array antenna 3 and the first vertical array antenna 7 constitute a first antenna pair 3, 7, and the second horizontal array antenna 5 and the second vertical array antenna 9 constitute a second antenna pair 5, 9. The antenna pairs 3, 7; 5, 9 are positioned at a distance d from each other. In the example in FIG. 2, each antenna pair is L-shaped, the "L":s being positioned at the distance d from each other.

According to the present invention, a first horizontal antenna port 4 is connected to a first polarization P1 in the corresponding antenna elements 11a, 11b, 11c, 11d, and a first vertical antenna port 8 is connected to a second polarization P2 in the corresponding antenna elements 13a, 13b, 13c, 13d. Furthermore, a second horizontal antenna port 6 is connected to the second polarization P2 in the corresponding antenna elements 12a, 12b, 12c, 12d, and a second vertical antenna port 10 is connected to the first polarization P1 in the corresponding antenna elements 14a, 14b, 14c, 14d. The first polarization P1 and the second polarization P2 are mutually orthogonal.

The first horizontal antenna port 4 and the first vertical antenna port 8 are combined in phase in a first combiner 23, and the second horizontal antenna port 6 and the second vertical antenna port 10 are combined with a phase difference of 180 degrees in a second shifting combiner 24. The first combiner 23 has a first main antenna port 16, and the second combiner 24 has a second main antenna port 17. In the following example, the phase difference of 180 degrees is accomplished in the second combiner 24.

With respect to a common symmetry point 15, each antenna element 11a, 11b, 11c, 11d; 13a, 13b, 13c, 13d in the first antenna pair 3, 7 is symmetrically arranged to a corresponding antenna element 12a, 12b, 12c, 12d; 14a, 14b, 14c, 14d in the second antenna pair 5, 9 such that a plurality of antenna element symmetry pairs 11a, 12a; 11b, 12b; 11c, 12c; 11d, 12d; 13a, 14a; 13b, 14b; 13c, 14c; 13d, 14d are formed. Certain complex weights wn are applied to the antenna elements of each symmetry pair, where a weight wn for a certain polarization P1, P2 in an antenna element in a symmetry pair equals the complex conjugated weight wn* for an orthogonal polarization P2, P1 in the other antenna element in the symmetry pair.

For example, as shown in FIG. 2, the first antenna element 11a of the first horizontal array antenna 3 is symmetrically arranged to the first antenna element 12a of the second horizontal array antenna 5 with respect to the symmetry point 15 along a first symmetry line 20. Furthermore, with respect to the symmetry point 15, the fourth antenna element 11d of the first horizontal array antenna 3 is symmetrically arranged to the fourth antenna element 12d of the second horizontal array antenna 5 along a second symmetry line 21, and the third antenna element 13c of the first vertical array antenna 7 is symmetrically arranged to the third antenna element 14c of the second vertical array antenna 9 along a third symmetry line 22. In the same way, all antenna elements form antenna element symmetry pairs 11a, 12a; 11b, 12b; 11c, 12c; 11d, 12d; 13a, 14a; 13b, 14b; 13c, 14c; 13d, 14d.

Also, as an example, the first antenna element 11a of the first horizontal array antenna 3 is weighted with a first horizontal antenna first weight w1H1, and the first antenna element 12a of the second horizontal array antenna 5 is weighted with a second horizontal antenna first weight w2H1, where the second horizontal antenna first weight w2H1 is the complex conjugate of the first horizontal antenna first weight w1H1, which means that w2H1=(w1H1)*, where the sign "*" denotes complex conjugate.

In the same way, for the symmetry pairs given as examples above, the fourth antenna element 11d of the first horizontal array antenna 3 is weighted with a first horizontal antenna fourth weight w1H4, and the fourth antenna element 12d of the second horizontal array antenna 5 is weighted with a second horizontal antenna fourth weight w2H4, where w2H4=(w1H4)*. Also, the third antenna element 13c of the first vertical array antenna 7 is weighted with a first vertical antenna third weight w1V3, and the third antenna element 14c of the second vertical array antenna 9 is weighted with a second vertical antenna third weight w2V3, where w2V3=(w1V3)*. All antenna element symmetry pairs 11a, 12a; 11b, 12b; 11c, 12c; 11d, 12d; 13a, 14a; 13b, 14b; 13c, 14c; 13d, 14d are weighted in this way.

Figure 3:
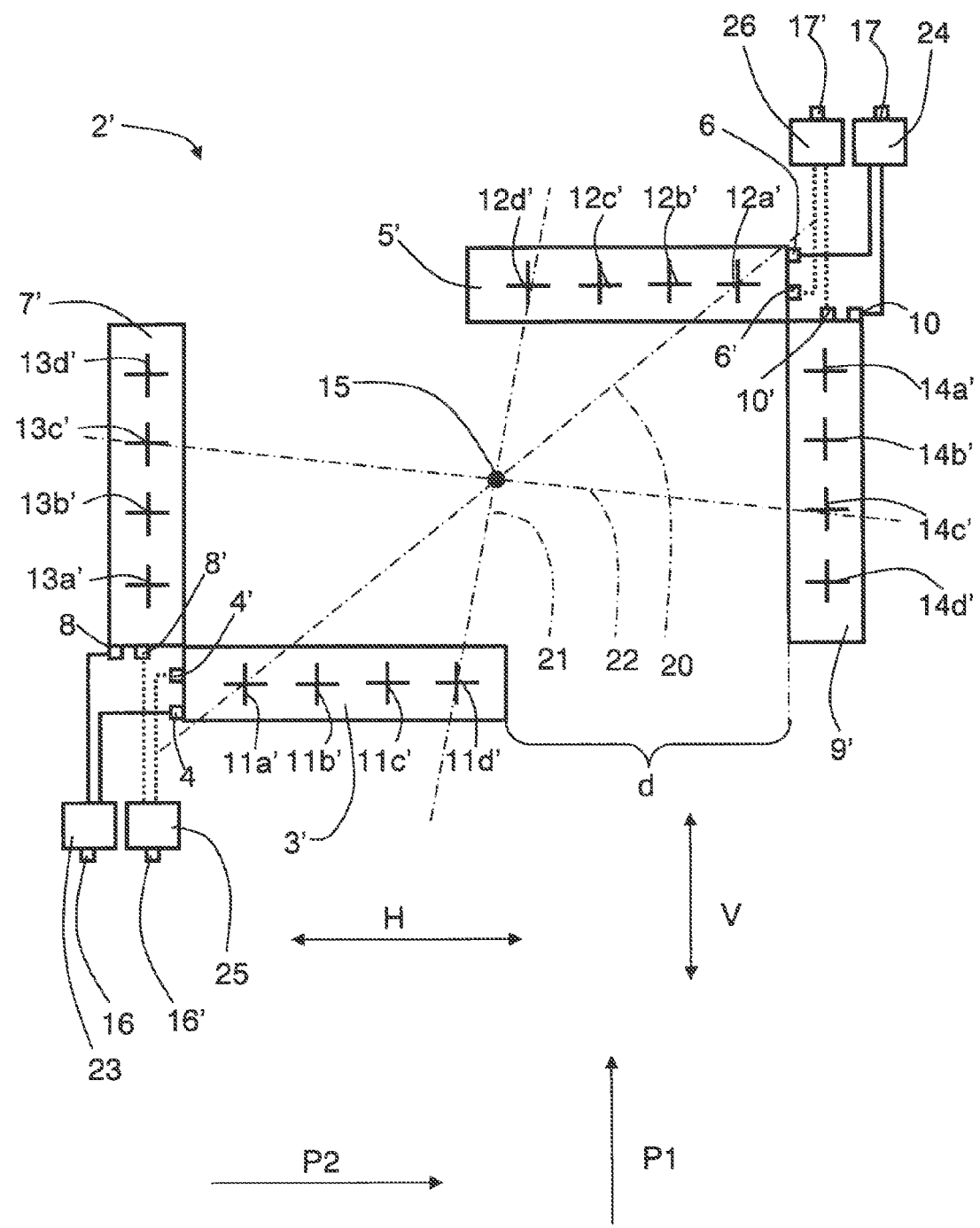
FIG. 3 schematically shows a second example of an antenna arrangement according to the present invention.

FIG. 3, shows a second example of the present invention. Here, the difference lies in that the antenna arrangement 2' comprises antenna elements 11a', 11b', 11c', 11d'; 12a', 12b', 12c', 12d'; 13a', 13b', 13c', 13d'; 14a', 14b', 14c', 14d' which all are dual polarized with both the first polarization P1 and the second polarization P2.

An additional first horizontal antenna port 4' is connected to the second polarization P2 in the corresponding antenna elements 11a', 11b', 11c', 11d' and an additional first vertical antenna port 8' is connected to the first polarization P1 in the corresponding antenna elements 13a', 13b', 13c', 13d'.

In the same way, an additional second horizontal antenna port 6' is connected to the first polarization P1 in the corresponding antenna elements 12a', 12b', 12c', 12d' and an additional second vertical antenna port 10' is connected to the second polarization P2 in the corresponding antenna elements 14a', 14b', 14c', 14d'.

The additional first horizontal antenna port 4' and the additional first vertical antenna port 8' are combined in phase in a third combiner 25, and the additional second horizontal antenna port 6' and the additional second vertical antenna port 10' are combined in a fourth combiner 26 with a phase difference of 180 degrees. The third combiner 25 has a third main antenna port 16', and the fourth combiner 26 has a fourth main antenna port 17'. The connections between the additional antenna ports 4', 6', 8', 10' and the corresponding combiners 25, 26 are indicated with dotted lines for reasons of clarity. In the same as in the previous example, a phase difference of 180 degrees is accomplished in the fourth combiner 26.

In the second example, there are four main antenna ports 16, 16', 17, 17'; two pairs with displaced phase centers where each pair has ports with orthogonal polarizations. This enables both spatial and polarization multiplexing with up to four-layer multiplexing or four-way diversity. The spatial displacement can also be used for user-specific beamforming, e.g., closed-loop precoding.

Figure 4:
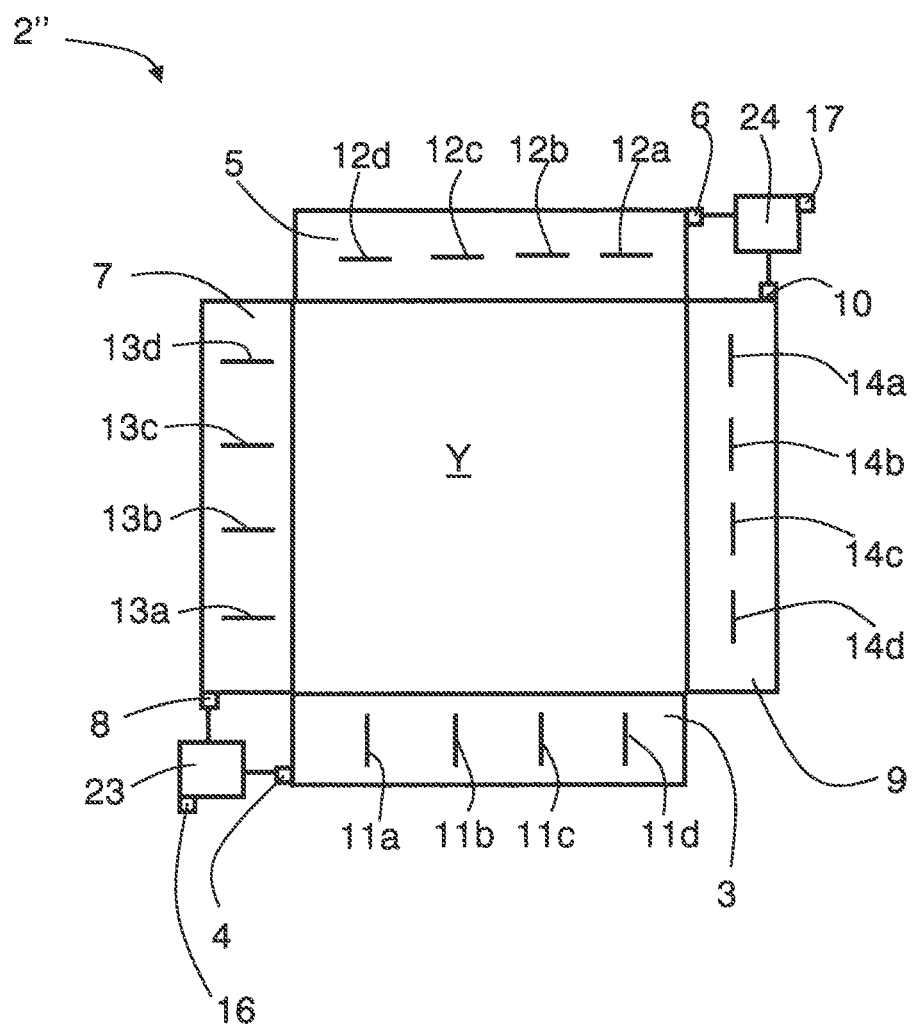
FIG. 4 schematically shows a third example of an antenna arrangement according to the present invention.

FIG. 4 shows a third example of an antenna arrangement 2'' which comprises a first antenna pair 3, 7 and a second antenna pair 5, 9, as in the first example, but here the antenna pairs 3, 7; 5, 9 are arranged to enclose an area Y, which means that the distance d between the antenna pairs 3, 7; 5, 9 essentially is zero. The empty area Y in the middle can be used for another application e.g., another antenna for another frequency band. Another alternative is to place parts of, or all, base station equipment in this area and mount everything in one enclosure. The antenna then acts as a frame for the base station. As yet another alternative the area Y may be used for, for example, displaying information or commercial visuals, with shared power supply and backhaul for the entire installation.

Figure 5:
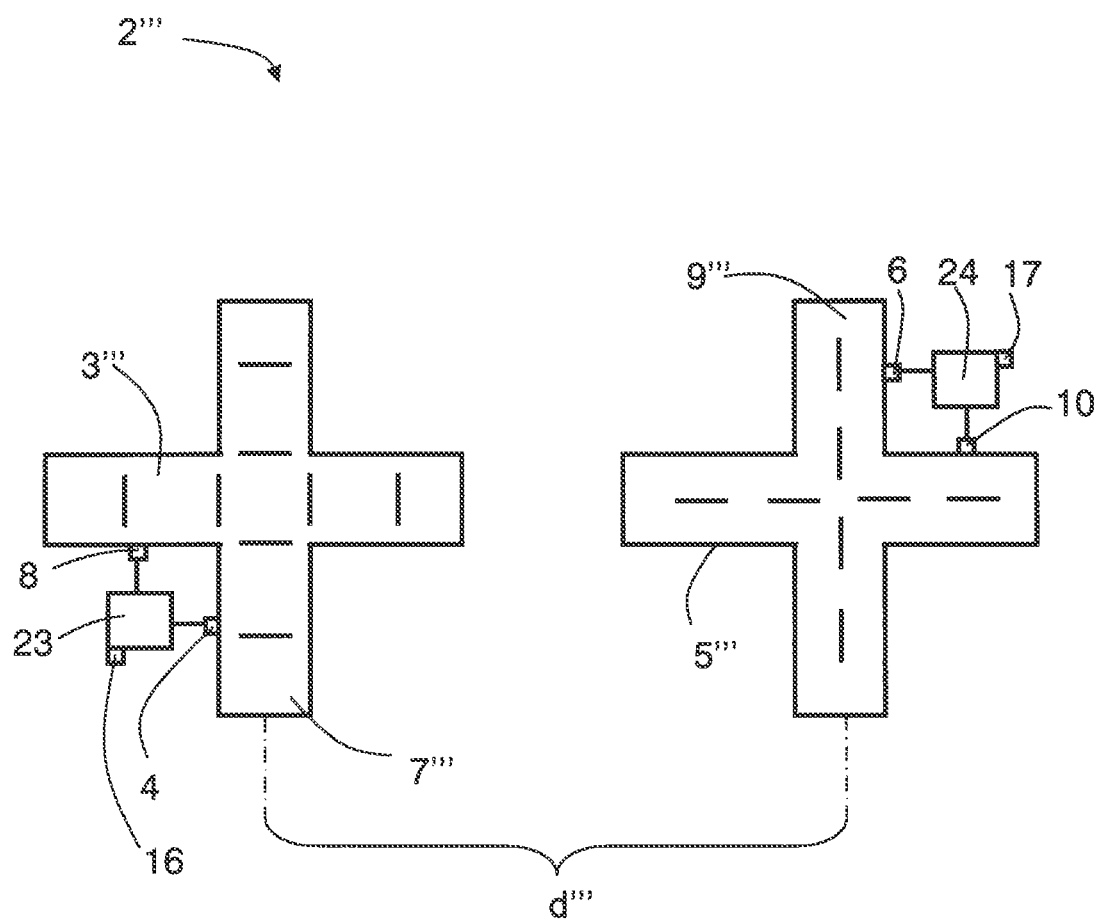
FIG. 5 schematically shows a fourth example of an antenna arrangement according to the present invention.

FIG. 5 shows a fourth example of an antenna arrangement 2''' which comprises antenna pairs 3''', 7'''; 5''', 9''' where, for each antenna pair 3''', 7'''; 5''', 9''', the array antennas are positioned in the form of a cross with a distance d''' between them. Here, each antenna 3''', 7'''; 5''', 9''' pair is preferably combined physically, such that each antenna pair constitutes a combined antenna. The other components shown are of the same type as for the first example, and therefore have the same reference signs. In this case as well, the antenna elements may be dual polarized as well. This may be regarded as two overlaid single-polarized cross-arrays in the same position.

When antenna ports are described to be combined, they may generally be regarded to be connected. When antenna ports are combined, or connected, with a phase difference of 180 degrees, they may generally be regarded to be combined, or connected, with opposite phases. The phase difference may be accomplished in many ways, for example in the combiners themselves as disclosed above.

A combiner can be implemented by analog or digital techniques. For example, if the arrays are active antenna arrays with a transmitter, receiver, a DAC (digital to analogue converter), and an ADC (analogue to digital converter) for each array element, a combination can be implemented by an addition and a combination with a phase difference of 180 degrees can be implemented by a subtraction in a digital computer.

Another example for implementing the phase difference may be to add a negative sign to appropriate weights instead. Then no phase difference is accomplished in any combiner. As an example of this, the weights applied to the antenna elements 14a, 14b, 14c, 14d; 14a', 14b', 14c', 14d' of the second vertical array antenna 9, 9' also, in addition to what has been described previously, comprise a negative sign, −1, but all other weights are constituted as described previous, comprising no additional negative sign.

Alternatively, the weights that are applied to the antenna elements 12a, 12b, 12c, 12d; 12a', 12b', 12c', 12d' of the second horizontal array antenna 5, 5' comprises an additional negative sign, −1, but all other weights are constituted as described previous, comprising no additional negative sign.

The antenna elements in each symmetry pair may have equal radiation patterns.

The present invention thus provides an antenna arrangement that gives good coverage for scenarios with vertical user distributions, such as high-rise buildings. This is achieved by combining vertically and horizontally oriented array antennas in a way such that the main antenna ports have orthogonal polarizations for all directions and have identical power radiation patterns designed to provide coverage for users on the ground as well as users inside a high building. This is achieved by proper phase-combining of antenna elements with orthogonal polarizations, where the elements are arranged in a configuration that provides a common symmetry point for orthogonally polarized elements corresponding to the two combined antenna ports. The combination can be made with full power amplifier utilization.

The present invention is based on combining antennas with orthogonal polarizations using proper phase adjustments, with the array elements displaced in such a way that orthogonally polarized antenna elements of the resulting two combined antenna ports have a common symmetry point. In this way orthogonal polarizations are obtained for all directions and the ports have identical power patterns. Another benefit is that the power amplifiers are fully utilized.

The present invention is not limited to the examples above, but may vary freely within the scope of the appended claims. For example, the number of antenna elements in each set of antenna elements may vary, but should be at least two. The antenna elements in each set of antenna elements may be conFIG.d in many ways, irregular as well as uniformly, uneven as well as linear. Each antenna element may be in the form of a slot antenna, a dipole element, a patch element, any combination of these, or any other suitable antenna element. Each antenna element may be constituted by a plurality of sub-elements.

Irrespective of the antenna configuration used, the antenna elements may either be linearly polarized or dual polarized. Other suitable polarizations are of course conceivable such as circular and elliptical polarization.

The node has been shown to comprise only one antenna arrangement, but may comprise any suitable number of antenna arrangements, for example three antenna arrangements which provides standard cell coverage.

The node may be of any suitable kind, but is preferably any type of base station or pico station.

The combination of the antenna ports can be performed analogously or digitally. The combiners 23, 24, 25, 26 are to be regarded as reciprocal elements, working both a combiners and dividers, and may generally be termed as combiner/dividers.

Terms such as horizontal, vertical, perpendicular, equal, orthogonal and opposite are not to be interpreted as mathematically exact, but as within what is practically obtainable in this field of technology. The same is the case with the phase difference of 180 degrees or the general corresponding term opposite phases mentioned.

The invention claimed is:

1. A node in a wireless communication system, the node comprising an antenna arrangement comprising:
    a first horizontal array antenna comprising a first set of antenna elements arranged along a first horizontal extension, each antenna element included in the first set of antenna elements having a first polarization (P1);
    a second horizontal array antenna comprising a second set of antenna elements arranged along a second horizontal extension, each antenna element included in the second set of antenna elements having a second polarization (P2), P1 and P2 being mutually orthogonal;
    a first vertical array antenna comprising a third set of antenna elements arranged along a first vertical extension that is perpendicular to the first horizontal extension, each antenna element included in the third set of antenna elements having a polarization of P2;
    a second vertical array antenna comprising a fourth set of antenna elements arranged along a second vertical extension that is perpendicular to the second horizontal extension, each antenna element included in the fourth set of antenna elements having a polarization of P1;
    a first horizontal antenna port, wherein each antenna element included in the first set of antenna elements is connected to the first horizontal antenna port;
    a second horizontal antenna port, wherein each antenna element included in the second set of antenna elements is connected to the second horizontal antenna port;
    a first vertical antenna port, wherein each antenna element included in the third set of antenna elements is connected to the first vertical antenna port; and
    a second vertical antenna port, wherein each antenna element included in the fourth set of antenna elements is connected to the second vertical antenna port,
    wherein
    the first set of antenna elements being arranged to radiate a first main beam having a half-power beamwidth in an elevation direction, which exceeds its half-power beamwidth in an azimuth direction with at least a factor two,
    the second set of antenna elements being arranged to radiate a second main beam having a half-power beamwidth in an elevation direction, which exceeds its half-power beamwidth in an azimuth direction with at least a factor two,
    the third set of antenna elements being arranged to radiate a third main beam having a half-power beamwidth in the azimuth direction, which exceeds its half-power beamwidth in the elevation direction with at least a factor two,
    the fourth set of antenna elements being arranged to radiate a fourth main beam having a half-power beamwidth in the azimuth direction, which exceeds its half-power beamwidth in the elevation direction with at least a factor two, and
    with respect to a common symmetry point, each antenna element in the first set of antenna elements is symmetrically arranged with a corresponding antenna element in the second set of antenna elements and each antenna element in the third set of antenna elements is symmetrically arranged with a corresponding antenna element in the fourth set of antenna elements such that a plurality of antenna element symmetry pairs is formed.

2. The node according to claim 1, wherein
for each one of the plurality of antenna element symmetry pairs, a first one of the antenna elements of said symmetry pair is weighted with a certain weight and the other antenna element of said symmetry pair is weighted with the complex conjugate of said certain weight.

3. The node according to claim 1, wherein
the first horizontal array antenna further comprising a fifth set of antenna elements arranged along the first horizontal extension, each antenna element included in the fifth set of antenna elements having a polarization of P2, where each antenna element included in the fifth set of antenna elements forms a dual-polarized antenna element along with one of the antenna elements included in the first set of antenna elements, the second horizontal array antenna further comprising a sixth set of antenna elements arranged along the second horizontal extension, each antenna element included in the sixth set of antenna elements having a polarization of P1, where each antenna element included in the sixth set of antenna elements forms a dual-polarized antenna element along with one of the antenna elements included in the second set of antenna elements, the first vertical array antenna further comprising a seventh set of antenna elements arranged along the first vertical extension, each antenna element included in the seventh set of antenna elements having a polarization of P1, where each antenna element included in the seventh set of antenna elements forms a dual-polarized antenna element along with one of the antenna elements included in the third set of antenna elements, and the second vertical array antenna further comprising an eighth set of antenna elements arranged along the second vertical extension, each antenna element included in the eighth set of antenna elements having a polarization of P2, where each antenna element included in the eighth set of antenna elements forms a dual-polarized antenna element along with one of the antenna elements included in the fourth set of antenna elements.

4. The node according to claim 3, further comprising:
a third horizontal antenna port, wherein each antenna element included in the fifth set of antenna elements is connected to the third horizontal antenna port;
a fourth horizontal antenna port, wherein each antenna element included in the sixth set of antenna elements is connected to the fourth horizontal antenna port;
a third vertical antenna port, wherein each antenna element included in the seventh set of antenna elements is connected to the third vertical antenna port; and
a fourth vertical antenna port, wherein each antenna element included in the eighth set of antenna elements is connected to the fourth vertical antenna port.

5. The node according to claim 1, wherein the antenna elements in each antenna element symmetry pair have equal radiation patterns.

6. The node according to claim 1, wherein the first horizontal antenna port is connected to a first main port and the first vertical antenna port is also connected to said first main port.

7. The node according to claim 1, wherein the first horizontal antenna port is connected to a first main port via a combiner and the first vertical antenna port is also connected to said first main port via said combiner.

8. The node according to claim 1, wherein
the first horizontal antenna port and the first vertical antenna port are connected in phase,
the second horizontal antenna port and the second vertical antenna port are connected with opposite phases.

9. The node according to claim 1, wherein the antenna arrangement comprises a first antenna pair and a second antenna pair, where the antenna pairs are arranged to enclose an area.

10. The node according to claim 1, wherein the antenna arrangement comprises antenna pairs where, for each antenna pair, the array antennas are positioned in the form of a cross.

* * * * *